United States Patent

Brawley, Jr.

[15] 3,668,696

[45] June 6, 1972

[54] RING CORE KEYBOARD ENTRY DEVICE

[72] Inventor: Harry E. Brawley, Jr., Lexington, Mass.

[73] Assignee: Data Electronics Corporation, Burlington, Mass.

[22] Filed: Sept. 28, 1970

[21] Appl. No.: 76,163

[52] U.S. Cl. ..........................340/365, 179/90 K, 178/17 C, 340/174 AB, 340/174 SP

[51] Int. Cl. ....................................G08c 1/00, G11c 17/00

[58] Field of Search .........340/365, 174 AB, 174 SB, 173 SP, 340/345; 307/88 LC, 88 MP; 179/90 K; 178/17 R, 17 C

[56] References Cited

UNITED STATES PATENTS

| | | | |
|---|---|---|---|
| 2,882,524 | 4/1959 | Spencer | 340/347 |
| 3,091,700 | 5/1963 | Harper | 340/365 |
| 3,160,875 | 12/1964 | Bernard | 340/365 |
| 3,210,734 | 10/1965 | Andrews | 340/365 |
| 3,469,247 | 9/1969 | Boulter | 340/174 AB |

*Primary Examiner*—John W. Caldwell
*Assistant Examiner*—Robert J. Mooney
*Attorney*—Schiller & Pandiscio

[57] ABSTRACT

A keyboard entry device which employs a plurality of ring cores which are selectively threaded in a different combination by leads from a plurality of keys in a keyboard. The keys serve to connect the cores to an a-c power source, and each core is coupled to an output circuit which is resonant at about the frequency of the power source.

5 Claims, 1 Drawing Figure

PATENTED JUN 6 1972 3,668,696
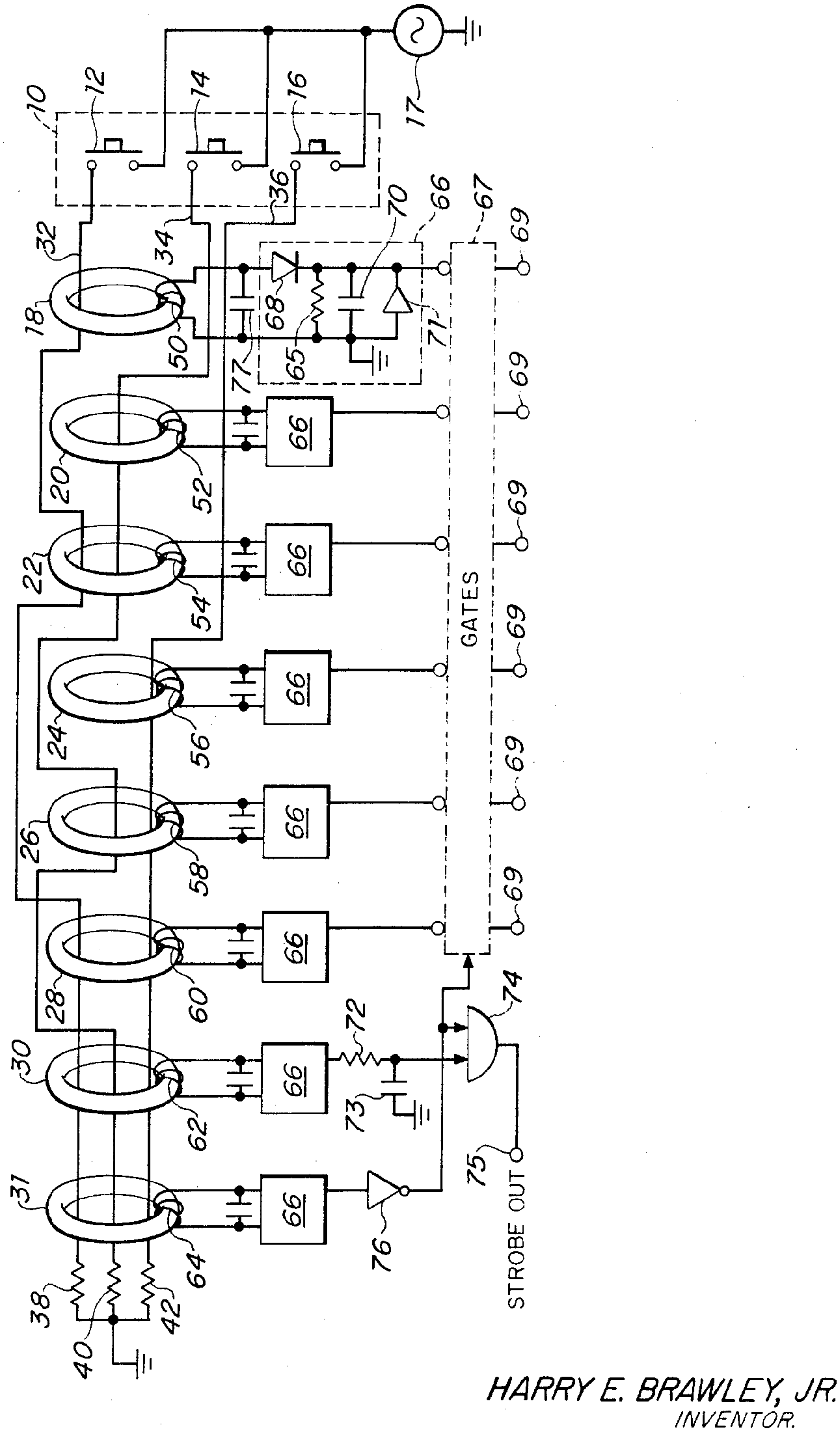
HARRY E. BRAWLEY, JR.
INVENTOR.
BY
Schiller & Pandiscio
ATTORNEYS.

RING CORE KEYBOARD ENTRY DEVICE

This invention relates to keyboard entry devices and more particularly to the techniques of using ring cores in keyboard types of devices, and to a ring core keyboard entry device.

A keyboard in the digital data processing and communications fields serves as an interface between the human operator and many types of electronic equipment including computers, displays, and other electronic as well as electro-mechanical instruments. A typical keyboard entry device consists of four basic elements: the key assembly, the encoder, the information control and the information storage, all driven, of course, from a power source of some type.

There are a number of different keyboard entry devices which have been used in the prior art. One type employs a purely electro-mechanical system using mechanical switches and springs with the major disadvantage that the reliability of the device is low primarily due to wear of the elements. Another type of keyboard entry devices includes the use of reed switches. Although the reed switch system represents an improvement over the use of mechanical switches and springs, the cost of reed switches is relatively high and reliability is still a problem. The encoding system, generally a diode matrix, which is usually employed with either mechanical switches or reed-relay is not only costly, but has a questionable level of reliability due to the large number of elements required in the matrix.

Still another approach is a system having photo-electric switching elements. While this system reduces the number of electro-mechanical linkages employed, other problems result from low reliability of the light source and from high cost of electronic amplifiers. "Hall Effect" code generation which is used in yet another entry device is extremely costly because of the requirement for a separate code generator for each key. It also requires the ability to detect and amplify very low and temperature-variable signal outputs from the generators. The capacitive coupling approach uses the effect of capacitive variation as a result of key movement, and mechanical encoding of the key output. Such a system requires a separate set of capacitive circuits for each key and also suffers from the requirement to detect and amplify low and temperature-variable signals. Another approach utilizes a separate magnetic core and related amplification circuitry for each key which again is an expensive system. Such magnetic core systems have been utilized in electrical code translators.

An object of the present invention is to provide a keyboard entry device in which the foregoing disadvantages of the prior art are overcome by providing a reliable, easily operable, and economical unit. This object as well as others are accomplished by providing a keyboard entry device comprising a plurality of switching means adapted to be coupled to a time-varying source of power and a plurality of ring or transformer cords. A first plurality of electrically conductive means are provided, each being selectively threaded through a unique combination of cores and being connected to a corresponding one of the switching means so as to be connectable by the latter to the power source. Second separate electrically conductive means are coupled to each one of the cores so that upon actuation of any one of the switching means, an output signal is generated in corresponding second conductive means dependent upon the unique combination of cores which are threaded by the one of the first plurality of electrically conductive means connected to the actuated switching means.

In the ring core keyboard entry device of the present invention, the inductance of the second electrically conductive means is matched to an RC load to provide a circuit resonant about the fundamental frequency of the input from the power source; i.e., the secondary winding of each core is made resonant at or near the frequency of the driving oscillator. This may be accomplished by using either series or shunt capacitive elements, or by other known means. The first plurality of electrically conductive means may be simply wires which provide direct ground connections for the keys or switching means.

The basic encoding technique can also be used with any one of many keys or switching means such as spring contact, reed contact, magnetic proximity switch, and capacitive coupling switches. The power source used is of the continuously varying signal type, such as square wave or sinusoidal, and when used in conjunction with any of the key or switching means stated above, will provide a continuous and a similar sinusoidal or square wave signal at the output of the encoder. The output signal may then be detected, for example, by half or full wave rectifiers, and the detected output levels will remain high as long as the key is depressed, eliminating the need for data latching or storage.

The advantages of the present invention lie in that the resonant core secondary offers more output voltage at the frequency of interest for like power than a nonresonant core secondary. Additionally, the resonated data core secondary windings discriminate against noise pick-up at frequencies outside the desired band. Also, by using identical resonant elements, sufficient frequency tracking can be obtained to allow reliable performance over a wide range of ambient temperatures without degradation of circuit performance.

Other objects of the invention will, in part, be obvious and will, in part, appear hereinafter. The invention accordingly comprises the apparatus possessing the construction, combination of elements, and arrangement of parts which are exemplified in the following detailed disclosure, and the scope of the application of which will be indicated in the claims. For a fuller understanding of the nature and objects of the present invention reference should be made to the following detailed description taken in connection with the accompanying drawing wherein there is shown a schematic diagram of a keyboard entry device embodying the principles of the present invention.

Referring now to the drawing, there is shown a version of the present invention which includes a switch array or keyboard 10. The latter, for the sake of simplicity, is shown as a keyboard of only three keys 12, 14, and 16, although it will be apparent that the present invention may be utilized in a keyboard having any numbers of keys. The key used may be any one of a number of well known types of switching means, which, upon actuation, closes an electrical circuit. For example, the keys or switching means could be implemented by a switch contact either of the spring or magnetic reed version. One side of keyboard 10 is connected to power source 17, which in the form shown provides a sinusoidal a-c, typically at 150 KHz. Power source 17 is thus connected to one side of each of keys 12, 14, and 16.

A plurality of ring or transformer cores 18, 20, 22, 24, 26, and 28, are provided to serve as the encoding elements and as the interface between the mechanical keys and the electronic circuitry to be described. Obviously, the number of cores used depends on the code desired. The cores preferably are made of a material which has a relatively linear hysteresis characteristic. Although the cores are shown as the closed variety, they may also be either the open CI, open CC, open EE, or EI combinations, or split types. An open core is one made of two parts; for example, in a CI core, one part is in the shape of the letter C and the other in the shape of the letter I. Once the wires have been laid in the C portion, the two parts are brought together to close the core. The open EI combination is quite similar, except that one of the parts is in the shape of the letter E. Open and split cores are useful because of the greater ease in wiring than in the case of a closed core. Two additional cores, 30 and 31, are also provided not for encoding purposes, but for ancillary functions of strobe pulse generation and to provide a disable outputs as will be seen later.

The other side of each of keys 12, 14, and 16, are coupled respectively to electrically conductive means such as lead wires 32, 34, and 36. Wires 32, 34, and 36 are selectively threaded through the ring cores such that each wire passes through a unique combination of cores. The exact threading arrangement depends on the encoding required. In the embodiment shown, wire 32 is threaded through cores 18, 22, 28, 30, and 31, but is not threaded through cores 20, 24, and 26. Wire 34 is threaded through cores 20, 22, 26, 30, and 31, but is not threaded through cores 18, 24, and 28. Wire 36 is threaded through cores 24, 26, 28, 30 and 31, but is not threaded through cores 18, 20, and 22.

All three wires 32, 34, and 36, pass through ring cores 30 and 31. Core 30 is used to detect the depression of any and all key switches and provide a strobe signal. Core 31 is used to detect the simultaneous depression of two or more keys. The output of core 31 can be used to disable strobe signaling, to disable data output, and/or to signal an error condition which will be described with the operation of the device. After passing through core 31, all the wires 32, 34, and 36 are connected through respective load resistors 38, 40, and 42 to ground.

Each of the ring cores 18, 20, 22, 24, 26, 28, 30, and 31 have second separate electrically conductive means in the form of respective secondary windings 50, 52, 54, 56, 58, 60, 62, and 64 wound thereabout. Each of the secondary windings except winding 64 may have any desired number of turns, although all preferably have the same number, and preferably the turns ratio between the secondary windings and the wires 32, 34 and 36 are selected such that there are sufficient turns on the secondary windings to generate an output suitable to drive the electronic circuits without amplification. In order to give the logical effect of two or more, the number of turns for winding 64 is one-half of the number of turns on any of the other windings. Thus, only one-half as much signal is generated when only one key is depressed. When two or more keys are depressed, a full output will be generated. With this arrangement, each core serves as a transformer, the primary winding of which is the corresponding wire connected to the depressed key, and the secondary winding of which is used to generate the output signal. For purposes of illustrations, the secondary windings are resonated at the frequency of source 17 by connecting capacitor 77 across the secondary. The resonant secondary winding of each core is connected to a corresponding half-wave rectifier circuit 66 which detects the sinusoidal signals and converts them into logic levels. These logic levels could be fed directly to an external device or fed through optional gate 67 to data output terminal 69.

Typically, half-wave rectifier circuit comprises of a rectifier diode having one side connected in series to one side of a corresponding secondary winding. Load resistor 65, filter capacitor 70 and clamping diode 71 are all in parallel with one another and connected between the other side of rectifier diode 68 and system ground.

The output line from rectifier 66 connected to strobe core output winding 62 and is provided with a time delay circuit formed of series resistor 72 and shunt capacitor 73. The output of this time delay circuit is connected to gate 74. The strobe signal from the output of gate 74 at terminal 75 will signify to the external circuit that data is available from the keyboard device. Core 31, which generates the error signal has its output winding 64 giving a signal through rectifier 66 and then detector circuit 76. As indicated before, winding 64 has half as many turns as the other windings; thus, only half as much voltage value is fed into circuit 76, which may be of any well known design and is a threshold circuit.

The threshold value of circuit 76 is chosen such that simultaneous depression of two or more of the keys will cause the threshold value to be exceeded producing an inhibit signal from circuit 76. The output of circuit 76 is used both to inhibit strobe signal through gate 74 and to hold data signal at zero through gate 67.

In the operation of the device in the drawing depression of, for example, key 12 energizes cores 18, 22, 28, 30, and 31 to create an output from each core which is fed at resonance through corresponding rectifier 66 from the corresponding secondary windings 50, 54, 60, 62, and 64.

If two or more of the keys are simultaneously depressed, an output signal of sufficient value is applied to threshold circuit 76, which provides an output signal which block both strobe signal and data lines. Upon release of all keys and the next depression of a single key, the signals from the respective secondary windings are again fed through to output terminals.

The above described sequence of operation is a typical case where the keyboard is operated as a real time device. The external equipment, such as a central computer or other control logic, must be ready to receive the information as soon as and as long as the keyboard is operated. In other cases, however, the operation of the keyboard can be used in a "lock step" fashion. The lock-step operation, when a key is depressed, is such that information becomes available and a signal is set to the central computer or external logic signifying data is available. The data output from the keyboard must be held until an acknowledged signal is received from the central computer. In this case, the strobe signal indicated here will not be generated by the keyboard, but instead by the central computer and it is not necessary then to provide the device with core 30.

"Stobing" or timing indications that a signal is present due to depression of a key is provided by the output of gate 74. It should be noted that the strobe signal generated by core 30 and rectified by corresponding rectifier 66 is delayed by the time delay provided by resistor 72 and capacitor 73.

The optimum frequency for the input a-c from source 17 is selected according to the nature of the cores. For example, where the cores are 0 – 6 type from Indiana General Corporation, the optimum oscillator frequency should be selected about in the region of about 150 KHz to 200 KHz because somewhere at higher frequencies the losses in this type of core become excessive and at somewhat lower frequencies, the device requires an undesirably large number of turns on the secondary winding to be efficient.

Ordinarily, in a group of cores, one finds that the permeability at room temperature will typically vary as much as, from example, 20 percent from core to core. Additionally, electrical characteristics, such as permeability, of cores are usually quite temperature-variable. Hence, in the present system as exemplified by FIG. 1, improved system performance is realized by tuning; i.e., the secondary windings (such as 50 on core 18) are resonated at the frequency of source 17 by small capacitors 77. The increase in output over a nonresonant transformer secondary circuit and the broadness of the frequency range over which an increased output is available depend upon the loading of the resonant circuit: the ratio of the circuit impedance to the loading impedance or "Q."

Considerations of production tolerances, temperature coefficients of components, required temperature range and the like dictate a low Q (on the order of 1.5 to 2.0).

This can result in an over-all output voltage increase of about 6 db relative to the untuned circuit or less than one-fourth the drive power for equivalent voltage output.

If some care is taken in the selection of cores, and identical resonants elements are used in the oscillator and data output circuits, a typical temperature range of about −20 ° Centigrade to + 85° Centigrade can be accommodated with only moderate fall-off of design margins and little degradation in over-all performance, in spite of a 30 percent change in oscillator frequency over that range of temperature. One can, thus, readily establish unambiguous logic levels for the core outputs despite variations in permeability from core to core.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:

1. A keyboard entry device comprising:

a plurality of switching means for connecting said entry device to a source of substantially time-varying electrical power;

a plurality of ring cores;

a first plurality of electrically conductive means selectively threaded through said cores, each one of said conductive means being threaded through a unique combination of said cores and being connected to a corresponding separate one of said switching means so as to be connectable by the latter to said power source; and individual electrically conductive means coupled to each one of said cores so that upon actuation of any one of said switching means an output signal is generated in corresponding individual conductive means dependent upon the unique combination of cores which are threaded by said one of said first electrically conductive means connected to said actuated switching means, and means connected to each of said individual conductive means so as to provide a circuit resonant substantially to the fundamental frequency of the power from said source.

2. A device as set forth in claim 1 wherein said individual electrically conductive means each is a secondary winding and said means connected to each of said individual conductive means includes a resonating capacitor.

3. A device as defined in claim 2 wherein said capacitor shunts said secondary winding.

4. A device as set forth in claim 1 including rectifying means for detecting the output signal generated in said second conductive means.

5. A device as set forth in claim 1 wherein said ring cores are made of material having substantially linear hysteresis characteristics.

* * * * *